(12) United States Patent
Chiang

(10) Patent No.: US 10,579,348 B2
(45) Date of Patent: Mar. 3, 2020

(54) DATA STORAGE DEVICE AND DATA STORAGE METHOD FOR CERTIFYING FIRMWARE DATA

(71) Applicant: Silicon Motion, Inc., Jhubei, Hsinchu County (TW)

(72) Inventor: Yao-Pang Chiang, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 203 days.

(21) Appl. No.: 15/858,116

(22) Filed: Dec. 29, 2017

(65) Prior Publication Data

US 2018/0341469 A1    Nov. 29, 2018

(30) Foreign Application Priority Data

May 23, 2017   (TW) .............................. 106117015 A

(51) Int. Cl.
*H04L 9/32*      (2006.01)
*G06F 8/41*      (2018.01)
*G06F 13/16*     (2006.01)
*G06F 3/06*      (2006.01)
*H04L 9/06*      (2006.01)
*G06F 8/654*     (2018.01)

(52) U.S. Cl.
CPC .............. *G06F 8/43* (2013.01); *G06F 3/0604* (2013.01); *G06F 3/0658* (2013.01); *G06F 3/0679* (2013.01); *G06F 8/654* (2018.02); *G06F 13/1668* (2013.01); *H04L 9/0643* (2013.01); *H04L 9/3239* (2013.01); *H04L 2209/38* (2013.01)

(58) Field of Classification Search
CPC ... G06F 3/0679; G06F 16/152; H04L 9/0643; H04L 9/3236; H04L 9/3247
See application file for complete search history.

(56) References Cited

U.S. PATENT DOCUMENTS

2012/0324238 A1*  12/2012  Senda ..................... G06F 21/57
                                                        713/189
2014/0130151 A1    5/2014  Krishnamurthy et al.
2015/0086019 A1*  3/2015  Tamminen ............ H04L 9/0819
                                                        380/278

FOREIGN PATENT DOCUMENTS

CN          102750478 A    10/2012
TW          201519096 A     5/2015
TW          201619821 A     6/2016

* cited by examiner

*Primary Examiner* — Olugbenga O Idowu
(74) *Attorney, Agent, or Firm* — McClure, Qualey & Rodack, LLP

(57) ABSTRACT

A data storage device utilized for confirming firmware data includes a flash memory and a controller. The controller is coupled to the flash memory to receive at least one first hash data related to a first firmware data, and it divides the first hash data into a plurality of data groups. The controller sorts the data groups based on a predetermined sorting mechanism to generate a first sorting hash data. The controller includes an efuse region for writing the predetermined sorting mechanism. When the controller determines that a second sorting hash data of a second firmware data is identical to the first sorting hash data or a second hash data of the second firmware data is identical to the first hash data, the second firmware data is allowed to update the controller.

19 Claims, 11 Drawing Sheets

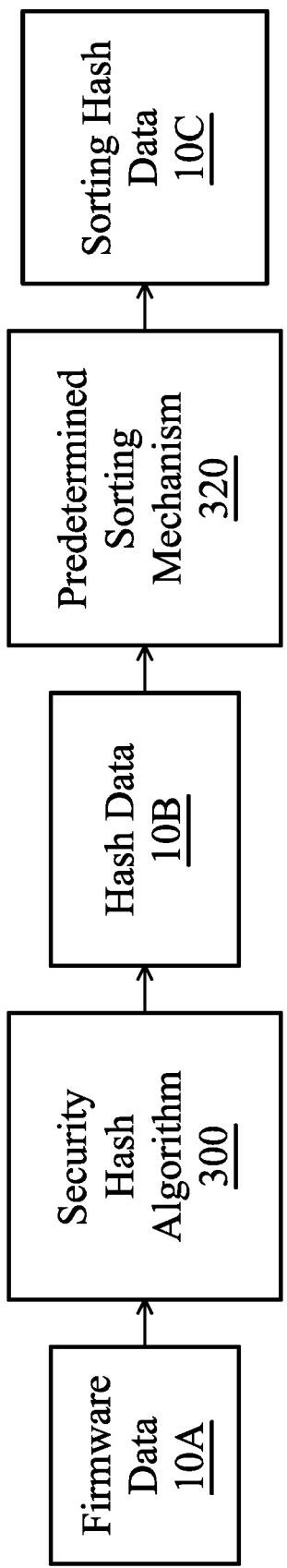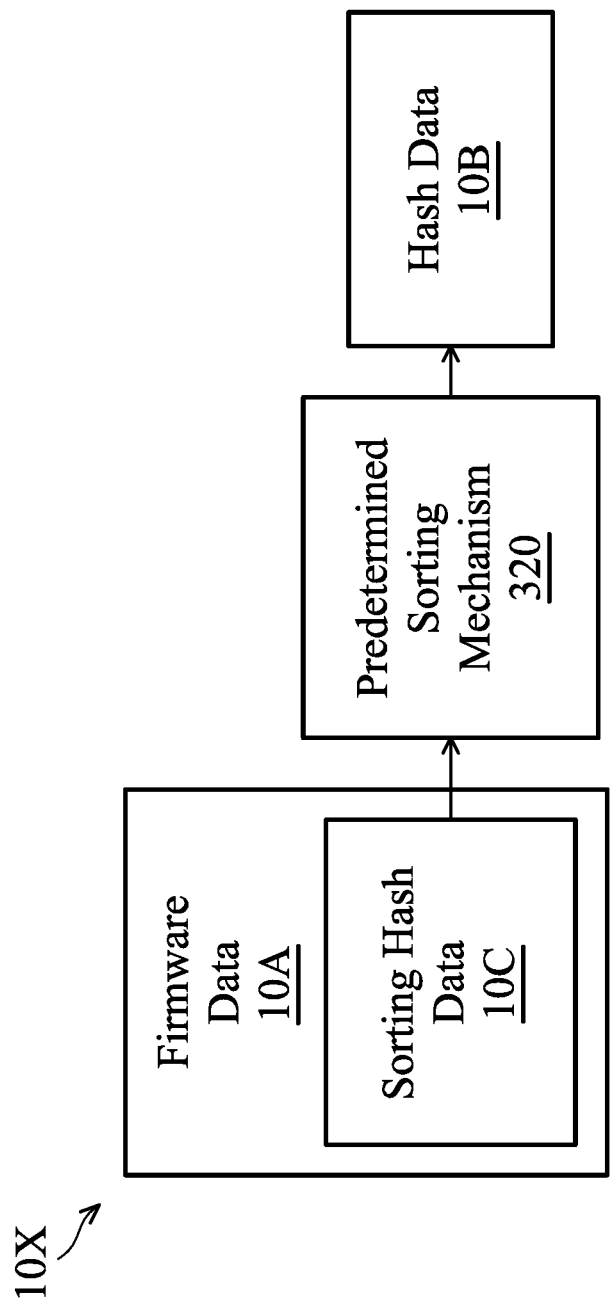
FIG. 2A
FIG. 2B

DATA STORAGE DEVICE AND DATA STORAGE METHOD FOR CERTIFYING FIRMWARE DATA

CROSS REFERENCE TO RELATED APPLICATIONS

This Application claims priority of Taiwan Patent Application No. 106117015 filed on May 23, 2017, the entirety of which is incorporated by reference herein.

BACKGROUND OF THE INVENTION

Field of the Invention

The disclosure generally relates to a data storage device and a data storage method, and more particularly, to a data storage device and a data storage method for certifying firmware data.

Description of the Related Art

Flash memory is a common type of non-volatile data storage device which electrically performs erasing and programming. NAND flash is often utilized in memory cards, USB flash devices, SSDs, eMMCs, UFSs, and so on.

Generally, the performance and reliability of a data storage device can be improved by updating the firmware. Updating the firmware can confirm that the data storage device is on the latest state and compatibility is guaranteed. However, when the data storage device updates with erroneous or illegal firmware, the data storage device might not be able to perform its normal operations such as reading and writing. The data storage device may even be damaged. Therefore, a data storage device and a data storage method for efficiently and conveniently certifying the firmware data are needed to confirm the legality and accuracy of the firmware data which is going to be used in an update.

BRIEF SUMMARY OF THE INVENTION

In order to solve the aforementioned problem, the invention proposes a data storage device and a data storage method for certifying the firmware data efficiently and conveniently, in order to confirm that the updated firmware data is accurate.

Specifically, the present invention provides a security hash algorithm (SHA) and a predetermined sorting mechanism to inspect whether or not the firmware data that is going to be installed is legal and accurate. At first, the SHA executes encryption and compression for the firmware data to generate the hash data. Afterwards, the predetermined sorting mechanism re-sorts the above hash data, and it is stored in specific locations in the data storage device. The above predetermined sorting mechanism is set up by the manufacturer of the data storage device. Whether or not the firmware data to be installed is identical to the legal and accurate firmware data certificated by the manufacturer of the data storage device can be determined by comparing the firmware data to be installed and its related hash data to the sorting hash data. Whether or not the firmware data to be installed is accurate and legal can be determined by the data storage device and the data storage method of the present invention to prevent the data storage device form being damaged deliberately.

In one aspect of the invention, a data storage device utilized for confirming firmware data includes a flash memory and a controller. The controller is coupled to the flash memory to receive at least one first hash data related to a first firmware data, and it divides the first hash data into a plurality of data groups. The controller sorts the data groups based on a predetermined sorting mechanism to generate a first sorting hash data. The controller includes an efuse region for writing the predetermined sorting mechanism. When the controller determines that a second sorting hash data of a second firmware data is identical to the first sorting hash data or a second hash data of the second firmware data is identical to the first hash data, the second firmware data is allowed to update the controller.

In another aspect of the invention, a data storage device utilized for confirming firmware data includes a flash memory and a controller. The controller is coupled to the flash memory to receive at least one first hash data related to a first firmware data, and it divides the first hash data into a plurality of data groups. The controller sorts the data groups based on a predetermined sorting mechanism to generate a first sorting hash data. The first hash data is generated by compressing the first firmware data based on a secure hash algorithm (SHA). The controller further comprises an efuse region for storing the predetermined sorting mechanism and the first sorting hash data.

In another aspect of the invention, a data storage method for certifying firmware data, applied to a data storage device which comprises a flash memory and a controller, is provided. The data storage method includes: receiving at least one first hash data which is related to a first firmware data; dividing the first hash data into a plurality of data groups, and sorting the data groups based on a predetermined sorting mechanism to generate a first sorting hash data. When the controller determines that a second sorting hash data of a second firmware data is identical to the first sorting hash data, or a second hash data of the second firmware data is identical to the first hash data, the data storage method includes allowing the second firmware data to update the controller.

Other aspects and features of the present invention will become apparent to those with ordinarily skill in the art upon review of the following descriptions of specific embodiments of the data storage device and the data storage method.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A is schematic illustrating a data storage method for certifying firmware data according to an embodiment of the invention;

FIG. 2B is schematic illustrating another data storage method for certifying firmware data according to an embodiment of the invention;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
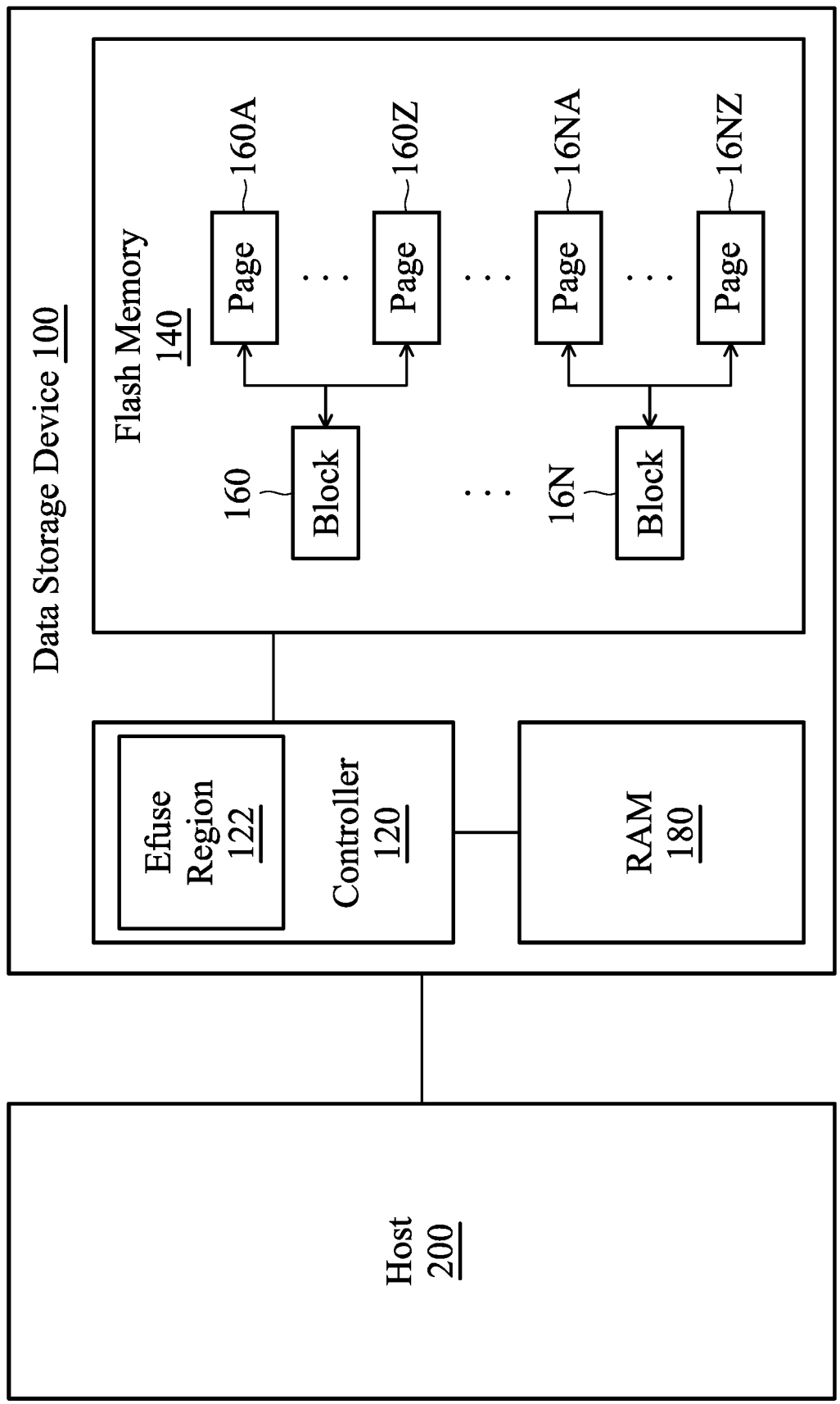
FIG. 1 is a schematic illustrating the data storage device and the host according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic illustrating the data storage device 100 and the host 200 according to an embodiment of the invention. In one embodiment, the data storage device 100 includes a controller 120, a non-volatile memory and a random access memory (RAM) 180. The controller 120 includes an electrical fuse (efuse) region 122. The data storage device 100 is coupled to the host for transmitting data and commands, or receiving data and commands. The non-volatile memory could be NAND flash, magneto-resistive RAM, ferroelectric RAM, resistive RAM (RRAM), spin transfer torque RAM (STT-RAM), and so on, in order to store data for a long time. The flash memory 140 will be taken as an example for illustration in the following description, but is not limited. The data storage device 100 complies with the eMMC standard, the UFS standard, the SATA standard or NVMe standard. The host 200 could be various kinds of electronic device such as a cell phone, a tablet computer, a laptop computer, a navigator, or a car system.

As shown in FIG. 1 and in FIG. 1B, the controller 120 is coupled to the flash memory 140 and the RAM 180. The RAM 180 is utilized to temporarily store and cache the data which is needed by the controller 120, or temporarily store the data which will be written to the flash memory 140 by the host 200 in order to facilitate timely access to the data storage device 100. The controller 120 performs a read operation on the flash memory 140 by controlling the flash memory 140 in units of clusters. In addition, the controller 120 is coupled to the flash memory 140 to transmit data and instructions or to receive data and instructions mutually.

The efuse region 122 is mainly utilized to store important data which is related to the security and access of the data storage device 100, such as a second key for decoding the first key. Under normal operations, only the controller 120 can read the data stored in the efuse region 122. In the debug mode, the efuse region 122 will be closed or shielded to avoid reading. It should be noted that the firmware data is one-time written to the efuse region 122.

The flash memory 140 includes a plurality of blocks 160A~160N, and N is a positive integer. For example, N is 2048. Specifically, each of the blocks 160A~160N further includes a plurality of physical pages 160A~16NZ. The A and Z are positive integers. For example, A is 0 and Z is 256. The block 160 includes physical pages 160A~160Z, and the block 16N includes physical pages 16NA~16NZ. When the controller 120 performs a write operation or a programming operation on the flash memory 140, it controls the flash memory 140 to perform the write or programming operation in units of physical pages.

Regarding the flash memory 140, each of the physical pages 160A~16NZ has a different physical address. In other words, each of the physical pages 160A~16NZ has a physical address, and each physical address of the physical pages 160A~16NZ is different. When a write operation is executed by the data storage device 100, the controller 120 determines the physical address of the flash memory 140 for writing or storing data. In addition, the physical addresses are mapped to a plurality of respective logical addresses by the controller 120. In addition, the controller 120 records the mapping relationship between the logical addresses and the physical addresses, and the above record is stored in a mapping table H2F. Therefore, for the host 200, the host 200 reads or writes data which is stored in a logical address by the data storage device 100 through the logical address.

FIG. 2A is schematic illustrating a data storage method for certifying firmware data according to an embodiment of the invention. The firmware data 10A is generated by a compiler. Afterwards, as shown in FIG. 2A, a hash data 10B is generated from the firmware data 10A using a secure hash algorithm (SHA) 300. For example, the hash data 10B with a length of 256 bits is generated from the firmware data 10A in the operation of SHA-256. It should be noted that the above SHA is for illustration, not for limiting the present invention.

In one embodiment, the controller 120 receives the firmware data 10A, and executes the SHA 300 for the firmware data 10A to generate and receive the hash data 10B. In another embodiment, other devices (such as the host 200) execute the SHA 300 for the firmware data 10A to generate the hash data 10B, and the controller 120 receives the hash data 10B.

In one embodiment, the controller 120 divides the hash data 10B into a plurality of data groups, and performs sorting for the above data groups with a predetermined sorting mechanism 320 to generate the sorting hash data 10C. The above predetermined sorting mechanism 320 is stored in the efuse region 122 of the controller 120. For example, the size of the hash data 10B is 8 bytes, and its content is illustrated as below:

TABLE I

| Value | 0x47 | 0x54 | 0x00 | 0x28 | 0x01 | 0x47 | 0x38 | 0x36 |
|---|---|---|---|---|---|---|---|---|
| Byte | 7 | 6 | 5 | 4 | 3 | 2 | 1 | 0 |

Table I illustrates the data of each byte of the hash data 10B. In one embodiment, the controller 120 divides the above data of 8 bytes into groups and generates multiple data groups. For example, the size of each data group is 1 byte. In other words, each 1-byte data is regarded as a data group. In another embodiment, the size of each data group is 2 bytes, which means that two 1-byte data are regarded as a data group. For example, in the Table I, 0x54 and 0x47 are a data group, and 0x28 and 0X00 is another data group. It should be noted that the data size of the data group is for illustration, not for limiting the present invention. Persons skilled in the art could arrange other data size for the data group without extend beyond the scope of the present invention.

In the embodiment, the data size of the hash data 10B is 8 bytes. In another embodiment, the data size of the hash data 10B is 32 bytes. When a more complicated SHA 300 and predetermined sorting mechanism 320, or other mechanisms (such as the predetermined division mechanism or the predetermined re-compression mechanism) are utilized, the efuse region 122 will need bigger storage to store the above mechanisms. The above predetermined division mechanism and the predetermined re-compression mechanism will be described in detail in FIG. 3 and FIG. 4 respectively.

In the embodiment, each 1-byte data becomes a data group. In other words, 0X54 of Table I is a data group, and 0x28 is another data group. Afterwards, the hash data 10B is sorted by the predetermined sorting mechanism 320 in units of data groups to generate the sorting hash data 10C. It should be noted that the predetermined sorting mechanism 300 is stored in the efuse region 122 is a manner of table. For example, the predetermined sorting mechanism 300 is illustrated in Table II:

TABLE II

| 0 | 7 | 6 | 5 | 1 | 3 | 4 | 2 |
|---|---|---|---|---|---|---|---|

Figure 9:
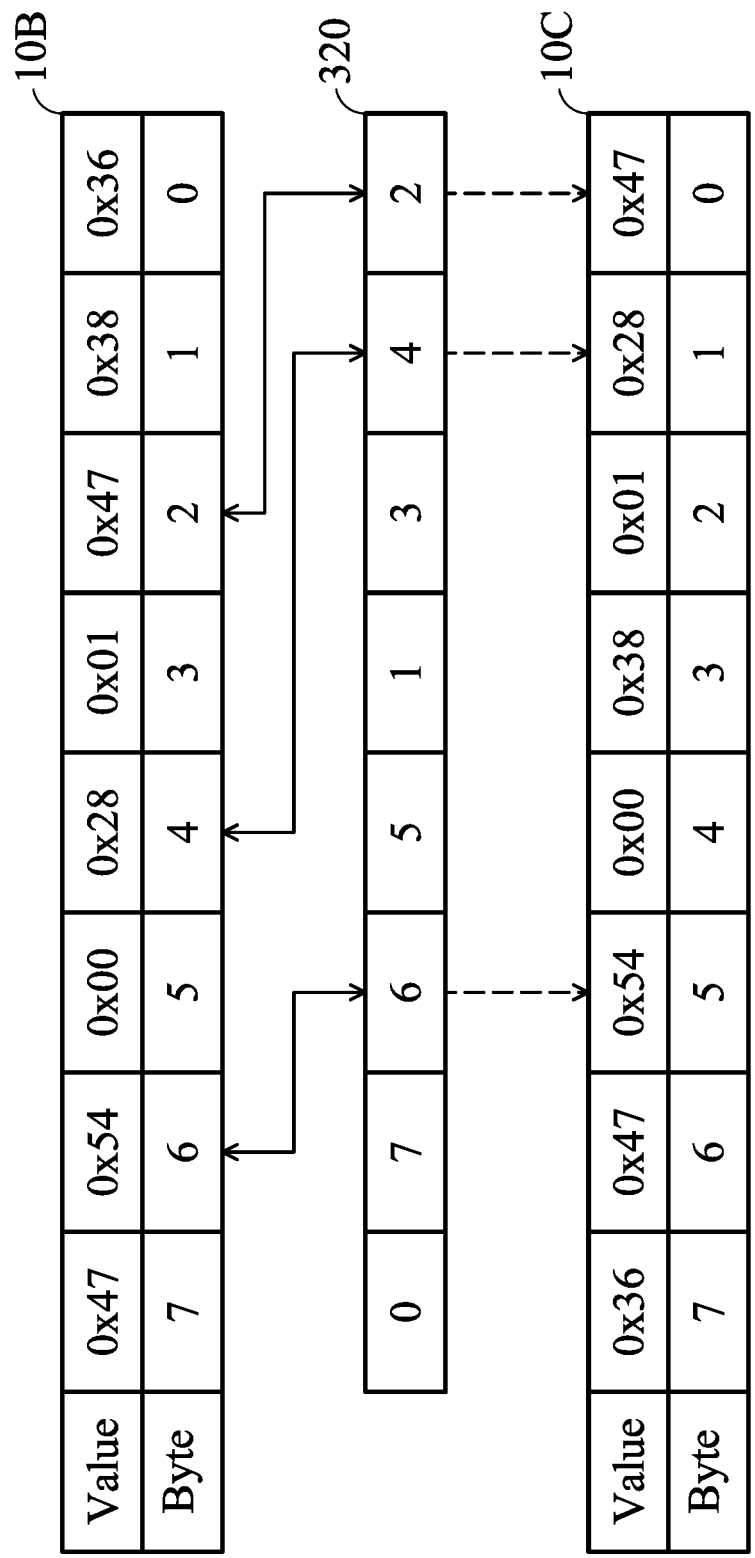
FIG. 9 is schematic illustrating another data storage method for certifying firmware data according to an embodiment of the invention.

The address of content of the hash data 10B is changed by the predetermined sorting mechanism 320. As shown in FIG. 9, 0x54 is changed from the position of Byte 6 to the position of Byte 5, 0x28 is changed from the position of Byte 4 to the position of Byte 1, and 0x47 is changed from the position of Byte 2 to the position of Byte 0. The sorting hash data 10C is generated finally.

Specifically, double protection mechanisms are provided by the data storage method of the present invention which include the SHA 300 and the predetermined sorting mechanism 320. The hash data 10B (as shown in Table I) generated by the SHA 300 is re-arranged and re-sorted by the predetermined sorting mechanism 320 to become the sorting hash data 10C (as shown in Table 3). When someone wants to update illegal firmware data to the data storage device 100, the hash data which is generated from the illegal firmware data by other security hash mechanisms will be different from the sorting hash data 10C. Therefore, the controller 120 could determine that the above hash data is illegal, and refuses to install or update the illegal firmware data for the data storage device 100.

FIG. 2B is schematic illustrating another data storage method for certifying firmware data according to an embodiment of the invention. In the embodiment, the sorting hash data 10C and the firmware data 10A constitute the firmware package 10X. Afterwards, the predetermined sorting mechanism 320 executes a reverse sorting for the sorting hash data 10C to generate the hash data 10B.

In one embodiment, the generation method or the storage location of the hash data 10B is set up by the manufacturer of the data storage device 100. Since other people are now aware of the generation method or the storage location of the hash data 10B, the controller 120 can inspect whether or not another firmware data is legal and accurate. Therefore, the data storage method of the present invention can avoid updating or installing illegal firmware data to protect the data storage device 100 from deliberate damage.

In one embodiment, the predetermined sorting mechanism 320 is set up by the manufacturer of the data storage device 100. For example, some people know the SHA 300 by illegal ways and know the storage location of the hash data 10B, combines another firmware data and the hash data 10B to form a firmware package, and intends to update the illegal firmware data to the data storage device 100. Because the person does not know the predetermined sorting mechanism 320, the data included by the firmware package is the hash data 10B, not the sorting hash data 10C generated by the predetermined sorting mechanism 320. Therefore, the controller 120 can distinguish the difference between the sorting hash data 10C and the hash data 10B, and further determine that the above firmware data is illegal. Afterwards, the controller 120 rejects installing or updating the illegal firmware data to the data storage device 100 to protect the data storage device 100 from deliberate damage.

Figure 2C:
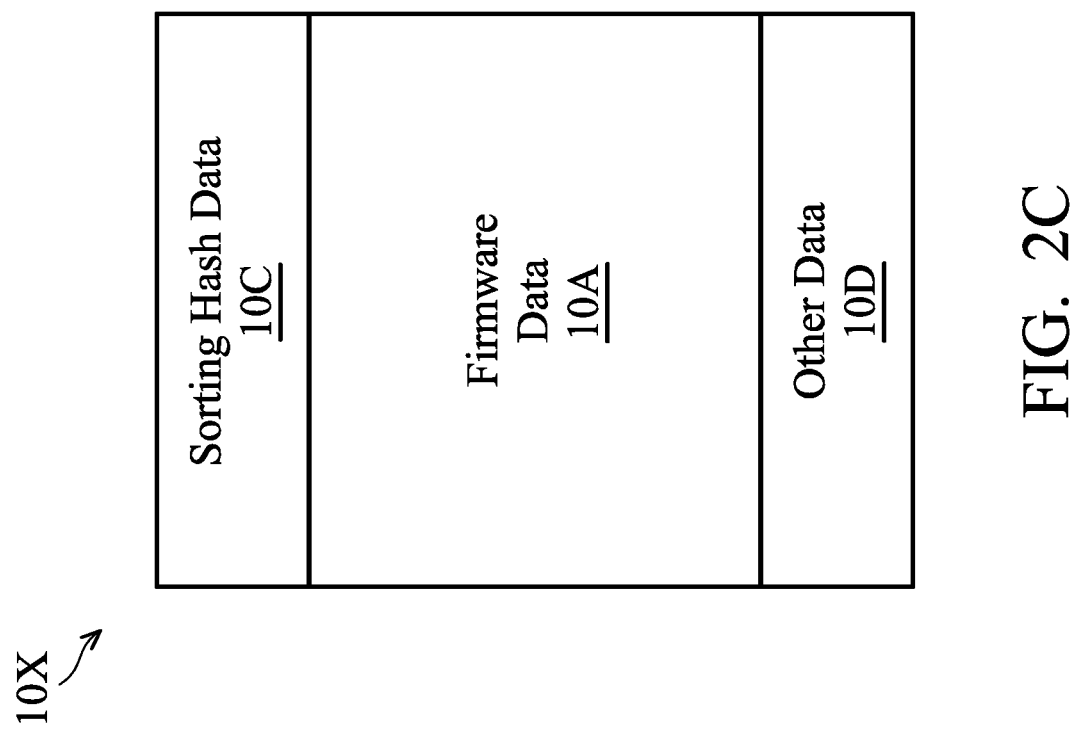
FIG. 2C is a schematic illustrating the firmware data according to an embodiment of the invention.

FIG. 2C is a schematic illustrating the firmware data according to an embodiment of the invention. As shown in FIG. 2C, in one embodiment, the sorting hash data 10C is stored above the firmware data 10A. In addition, other data 10D related to the firmware is stored below the firmware data 10A. In other words, the firmware package 10X includes the firmware data 10A, the sorting hash data 10C and other data 10D. For example, other data 10D includes the firmware edition, the edition of the SHA 300, and other security information which is stored by the customer. In other embodiments, the sorting hash data 10C could be stored below the firmware data 10A.

When the data storage device 100 receives the firmware package 10X, the controller 120 executes the SHA 300 for the firmware data 10A of the firmware package 10X to obtain the hash data 20B, and it executes the predetermined sorting mechanism 320 to obtain the sorting hash data 20C. In one embodiment, the controller 120 compares the sorting hash data 20C and the sorting hash data 10C stored by the firmware package 10X. When they are identical, it means that the firmware data 10A is legal and accurate. When they are not identical, it means that the firmware data 10A is illegal.

In another embodiment, when the storage device 100 receives the firmware package 10X, the controller 120 executes the SHA 300 for the firmware data 10A of the firmware package 10X to obtain the hash data 20B. Afterwards, the controller 120 executes the reverse predetermined sorting mechanism 320 for the sorting hash data 10C of the firmware package 10X to obtain the hash data 10B. Afterwards, the controller predetermined sorting mechanism 320 compares the hash data 20B and the firmware data 10B of the firmware package 10X. When they are identical, it means that the firmware data 10A is legal and accurate. When they are not identical, it means that the firmware data 10A is illegal.

Figure 3:
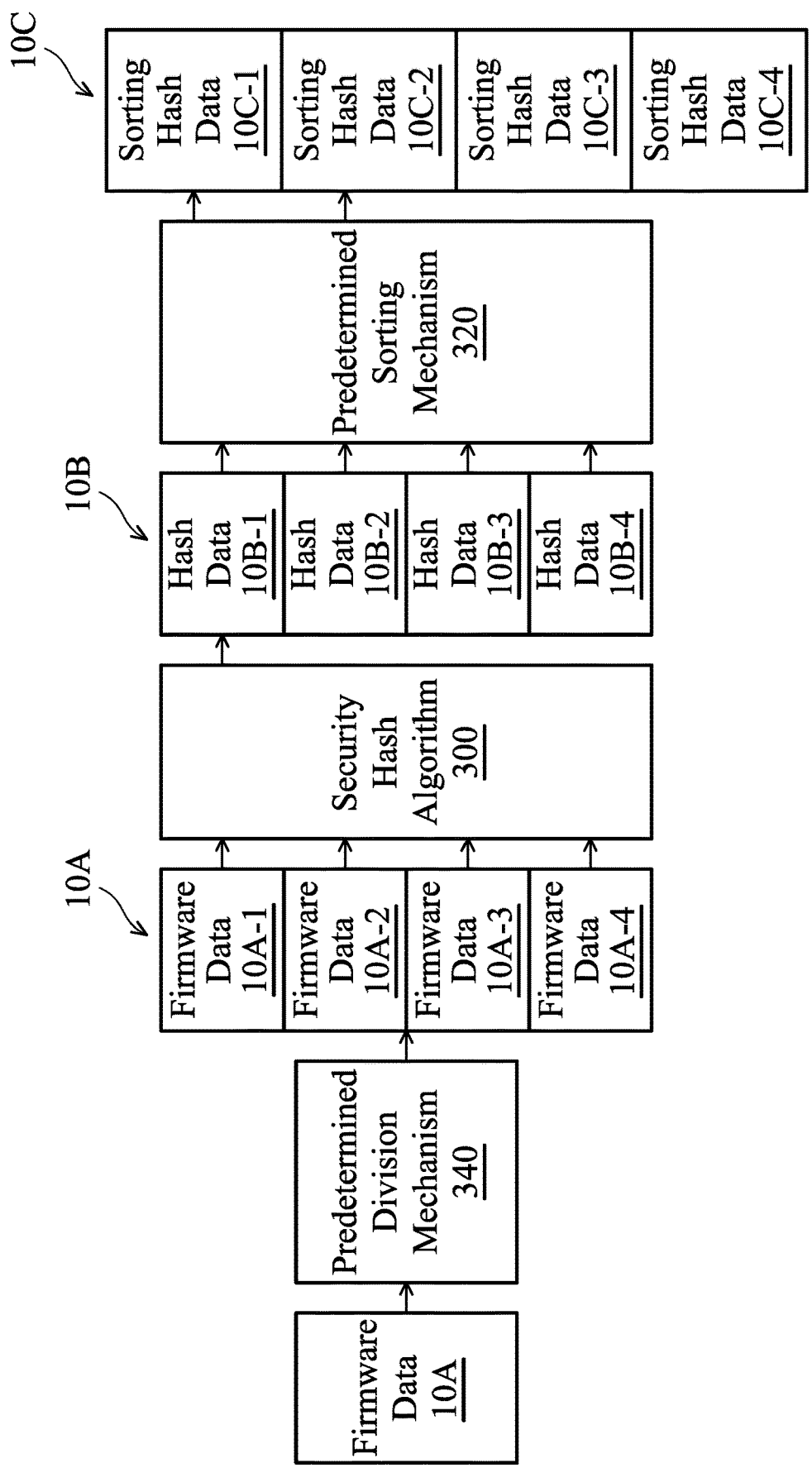
FIG. 3 is schematic illustrating a data storage method for certifying firmware data according to an embodiment of the invention.

FIG. 3 is schematic illustrating a data storage method for certifying firmware data according to an embodiment of the invention. In the embodiment, the data storage method further includes a predetermined division mechanism 340 to certificate the firmware data and improve the security. As shown in FIG. 3, the predetermined division mechanism 340 divides the firmware data 10A into four firmware data 10A-1, 10A-2, 10A-3 and 10A-4 (the sub-firmware data). In other words, the summation of the four firmware data 10A-1, 10A-2, 10A-3 and 10A-4 is the original firmware data 10A.

It should be noted that the division of the above four firmware data 10A-1-10A-4 are for illustration, not for limiting the present invention. Persons skilled the art could divide the firmware data of other numbers based on the content of the present invention, which are still within the scope of the present invention.

Afterwards, the SHA 300 performs the hash operation for the four firmware data 10A-1, 10A-2, 10A-3 and 10A-4, and generates four hash data 10B-1, 10B-2, 10B-3 and 10B-4. The summation of the four hash data 10B-1, 10B-2, 10B-3 and 10B-4 is the hash data 10B.

In one embodiment, the predetermined sorting mechanism 320 sorts four hash data 10B-1, 10B-2, 10B-3 and 10B-4, and generate four sorting hash data 10C-1, 10C-2, 10C-3 and 10C-4. The summation of the four sorting hash data 10C-1, 10C-2, 10C-3 and 10C-4 is the sorting hash data 10C. In another embodiment, the predetermined sorting mechanism 320 sorts four hash data 10B-1, 10B-2, 10B-3 and 10B-4 at the same time to generate a sorting hash data 10C.

Figure 4:
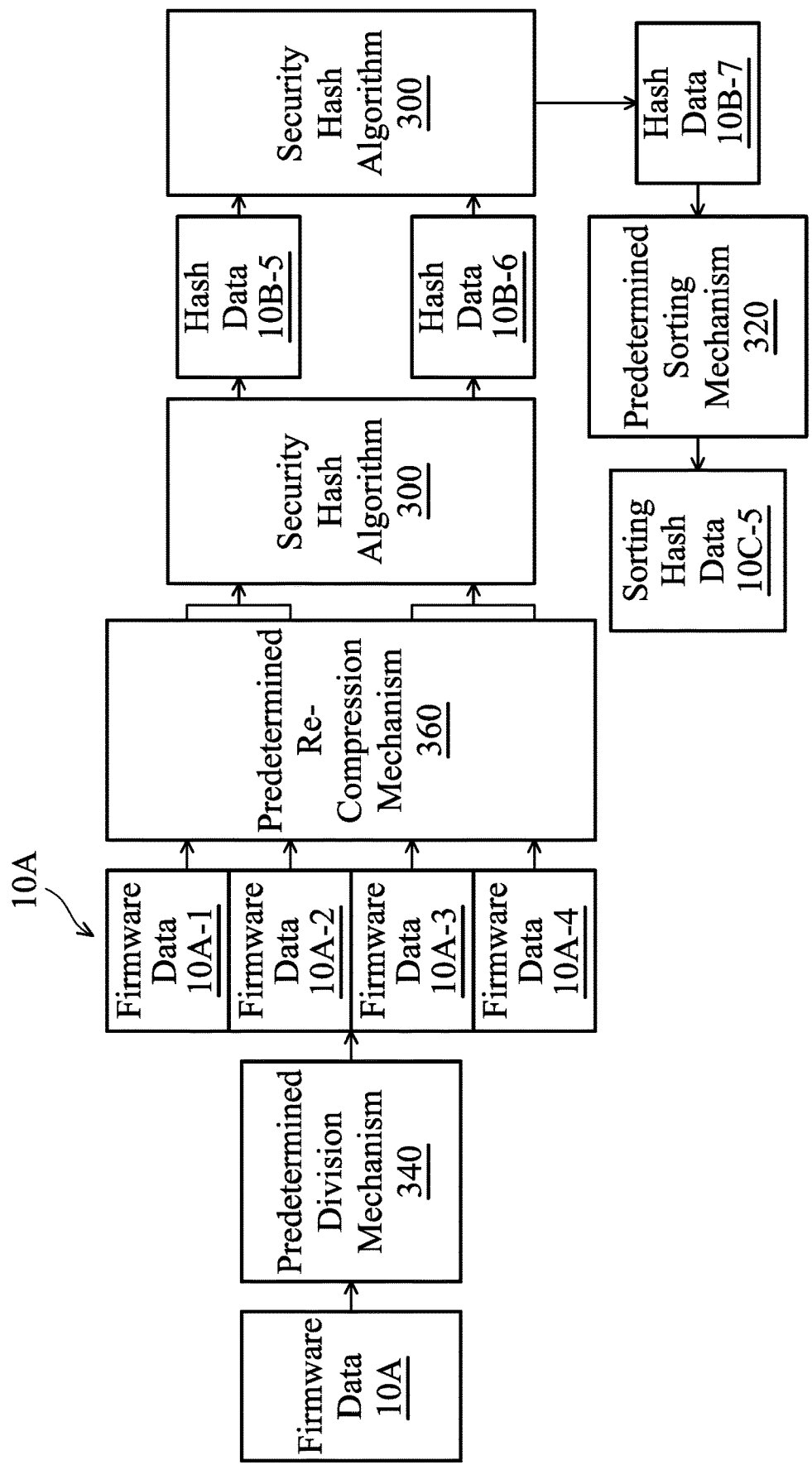
FIG. 4 is schematic illustrating another data storage method for certifying firmware data according to an embodiment of the invention.

FIG. 4 is schematic illustrating another data storage method for certifying firmware data according to an embodiment of the invention. In the embodiment, the data storage method further includes a predetermined re-compression mechanism 360 which executes at least two encryptions and compression for the firmware data 10A to certificate the firmware data 10A and improve the security. As shown in FIG. 4, the predetermined division mechanism 340 divides the firmware data 10A into four firmware data 10A-1, 10A-2, 10A-3 and 10A-4.

Afterwards, the predetermined re-compression mechanism 360 executes multiple compression on the four firmware data 10A-1, 10A-2, 10A-3 and 10A-4 (which means at least two encryptions and a compression). As shown in FIG. 4, the predetermined re-compression mechanism 360 arranges the firmware data 10A-1 and 10A-2 to become a group, and arranges the firmware data 10A-3 and 10A-4 to become another group. Afterwards, the two groups of firmware data are encrypted and compressed by the SHA 300 to generate two hash data 10B-5 and 10B-6 (the first sub-hash data) respectively. In other words, the hash data 10B-5 is generated by the firmware data 10A-1 and 10A-2, and the hash data 10B-6 is generated by the firmware data 10A-3 and 10A-4.

Afterwards, as shown in FIG. 4, the second compression is executed on the two hash data 10B-5 and 10B-6 by the hash 300 to generate the hash data 10B-7 (the second sub-hash data). Afterwards, in the embodiment, the predetermined sorting mechanism 320 sorts the hash data 10B-7 to generate a sorting hash data 10C-5. At least two SHA 300 are executed in the embodiment, therefore, the reliability and accuracy for identifying the firmware data could be improved further.

It should be noted that that the division of the above four firmware data 10A-1-10A-4 and two compressions are for illustration, not for limiting the present invention. Persons skilled the art could divide and compress the firmware data of other numbers based on the disclosed content of the present invention, which are still within the scope of the present invention.

Figure 5A:
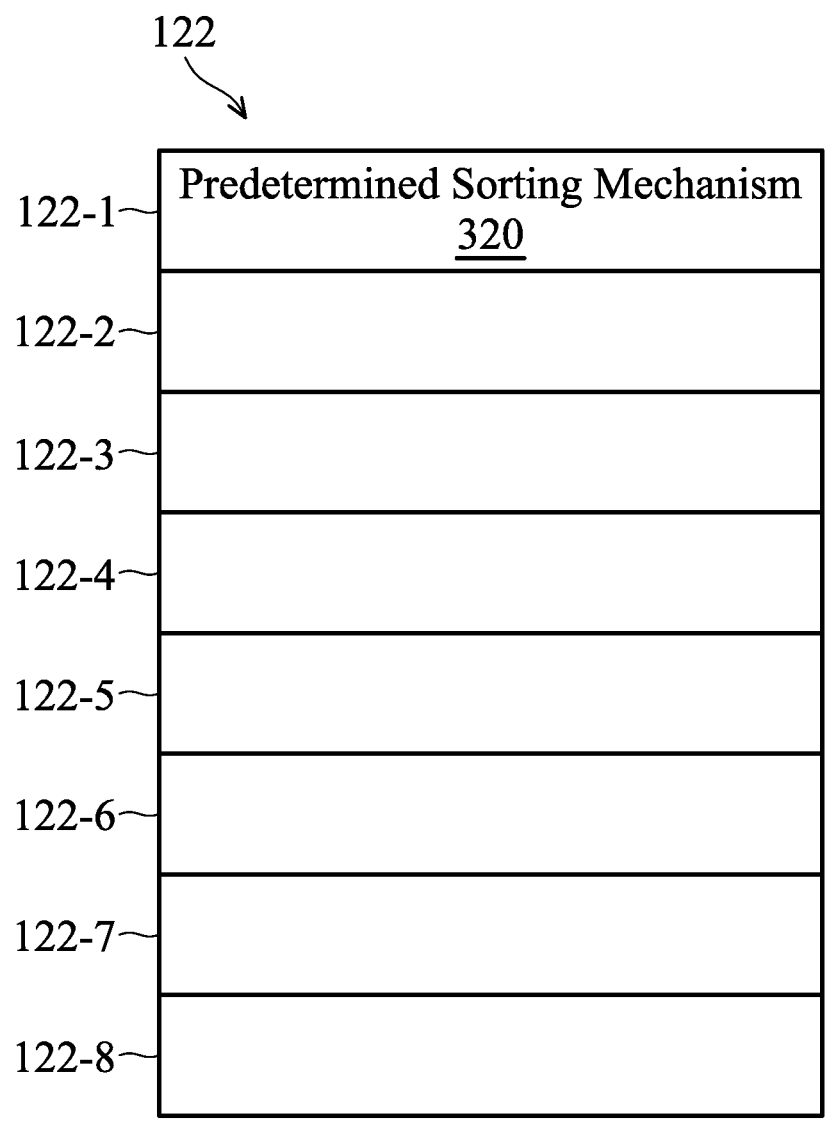
FIG. 5A is schematic illustrating an efuse region for certifying firmware data according to an embodiment of the invention.

FIG. 5A is schematic illustrating an efuse region 122 for certifying firmware data according to an embodiment of the invention. In one embodiment, the efuse region 122 includes a plurality of specific regions 122-1-122-8 to store specific data. As shown in FIG. 5A, the predetermined sorting mechanism 320 is stored in the specific region 122-1. In other words, the specific region 122-1 could only be utilized to store the predetermined sorting mechanism 320, and it cannot be utilized to store other mechanisms or data. In addition, the above predetermined sorting mechanism 320 is written into the efuse region 122 at one time, and it can only be read by the controller 120.

Figure 5B:
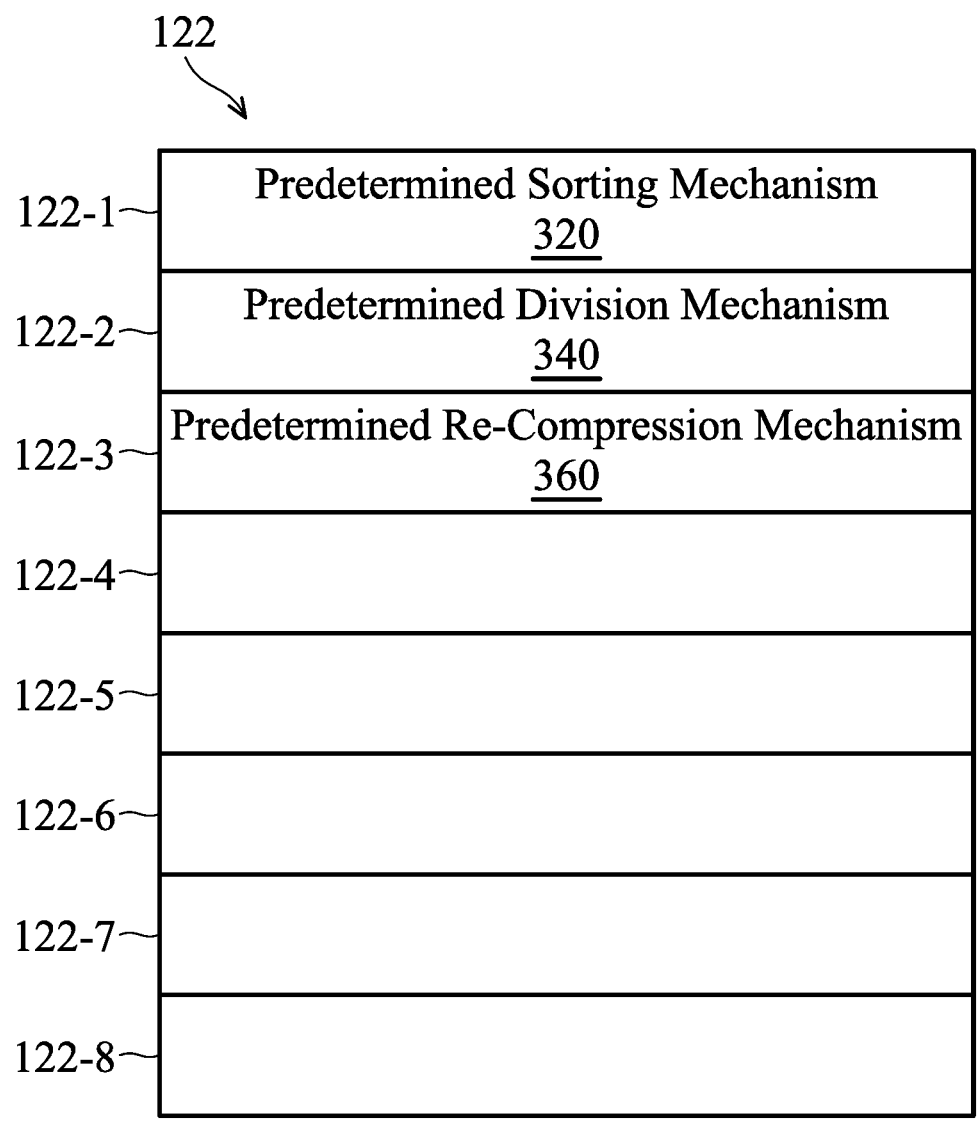
FIG. 5B is schematic illustrating another efuse region for certifying firmware data according to an embodiment of the invention.

FIG. 5B is schematic illustrating another efuse region 122 for certifying firmware data according to an embodiment of the invention. In some embodiment, the data storage method not only includes the predetermined sorting mechanism 320, but also includes the predetermined division mechanism 340 and the predetermined re-compression mechanism 360. It should be noted that if any one or two of the above mechanisms are complicated, at least two specific regions could be utilized to store one mechanism. As shown in FIG. 5B, the predetermined sorting mechanism 320 is stored in the specific region 122-1, the predetermined division mechanism 340 is stored in the specific region 122-2, and the predetermined re-compression mechanism 360 is stored in the specific region 122-3.

Figure 6:
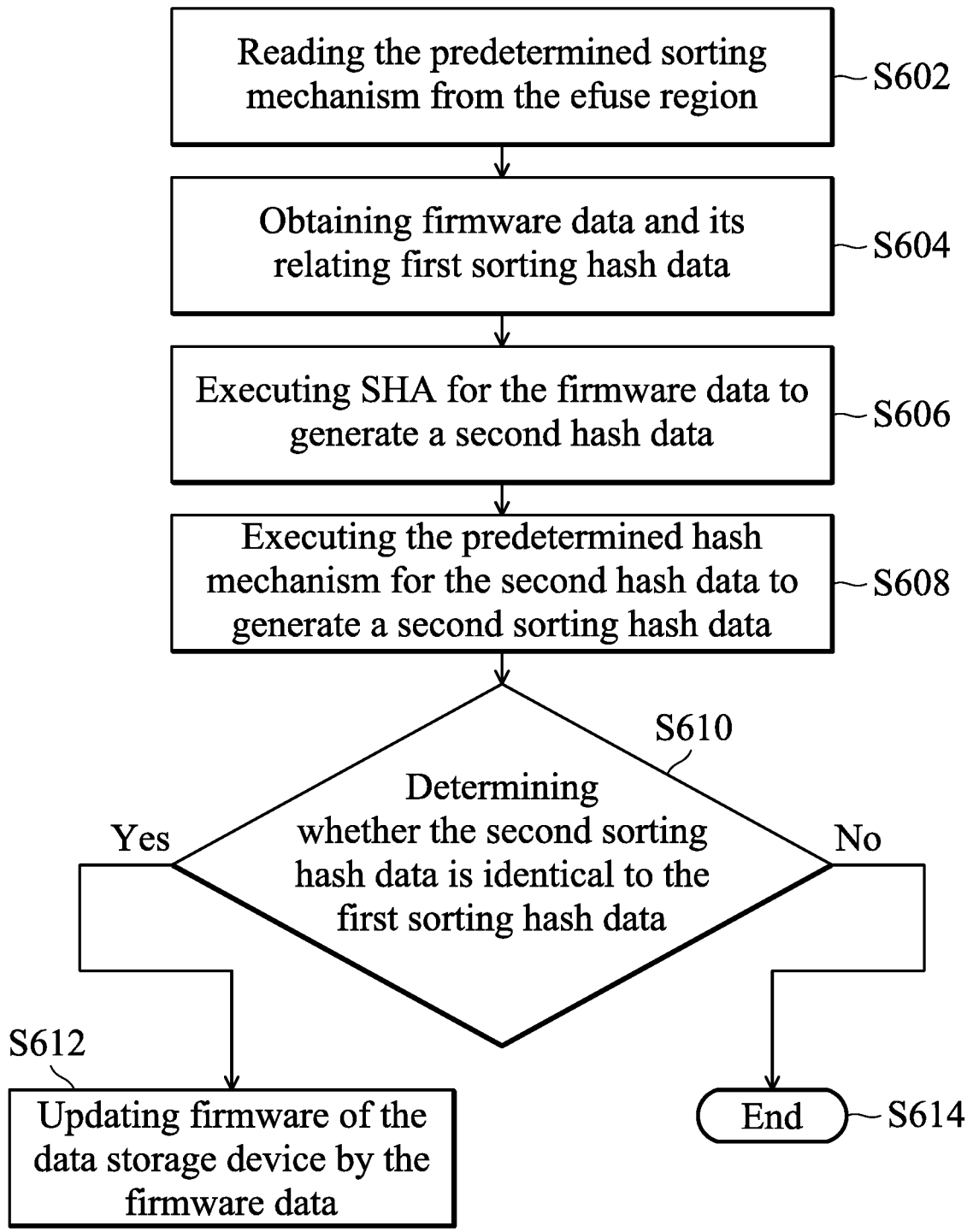
FIG. 6 is schematic illustrating a data storage method for certifying firmware data according to an embodiment of the invention.

FIG. 6 is schematic illustrating a data storage method for certifying firmware data according to an embodiment of the invention. In step S602, the controller 120 reads the predetermined sorting mechanism predetermined sorting mechanism 320 from the efuse region 122. Afterwards, in step S604, the controller 120 obtains the firmware data and its related first sorting hash data. The firmware data and the first sorting hash data are obtained from the firmware package. In step S606, the controller 120 executes the SHA 300 for the firmware data to generate a second hash data. In step S608, the controller 120 executes the predetermined hash mechanism predetermined sorting mechanism 320 for the second hash data to generate a second sorting hash data. In step S610, the controller 120 determines whether the second sorting hash data is identical to the first sorting hash data or not. If they are not identical, step S614 will be executed to terminate the execution of the data storage method for certifying firmware data. If they are identical, step S612 will be executed so that the controller 120 updates firmware of the data storage device 100 by the firmware data. Therefore, in step S610, it determines whether the second sorting hash data is identical to the first sorting hash data obtained in step S604, and the firmware data that is going to be installed could be inspected whether or not it is the legal and accurate firmware data which is certificated by the manufacturer of the data storage device 100. By utilizing the data storage device and the data storage method of the present invention, it can be determined whether or not the above firmware data is accurate and legal to protect the data storage device 100.

In another embodiment, step S608 could be changed so that the controller 120 executes the reverse predetermined sorting mechanism 320 for the first sorting hash data to generate a first hash data. Step S610 could be changed so that the controller 120 determines whether or not the second hash data is identical to the first hash data. The difference between the embodiment and the above embodiment is the object for executing the predetermined sorting mechanism 320 and its execution method. If the object is the second hash data, the predetermined sorting mechanism 320 is performed on the second hash data. If the object is the first sorting hash data, the reverse predetermined sorting mechanism 320 is performed on the first sorting hash data. The remaining steps are the same.

Figure 7:
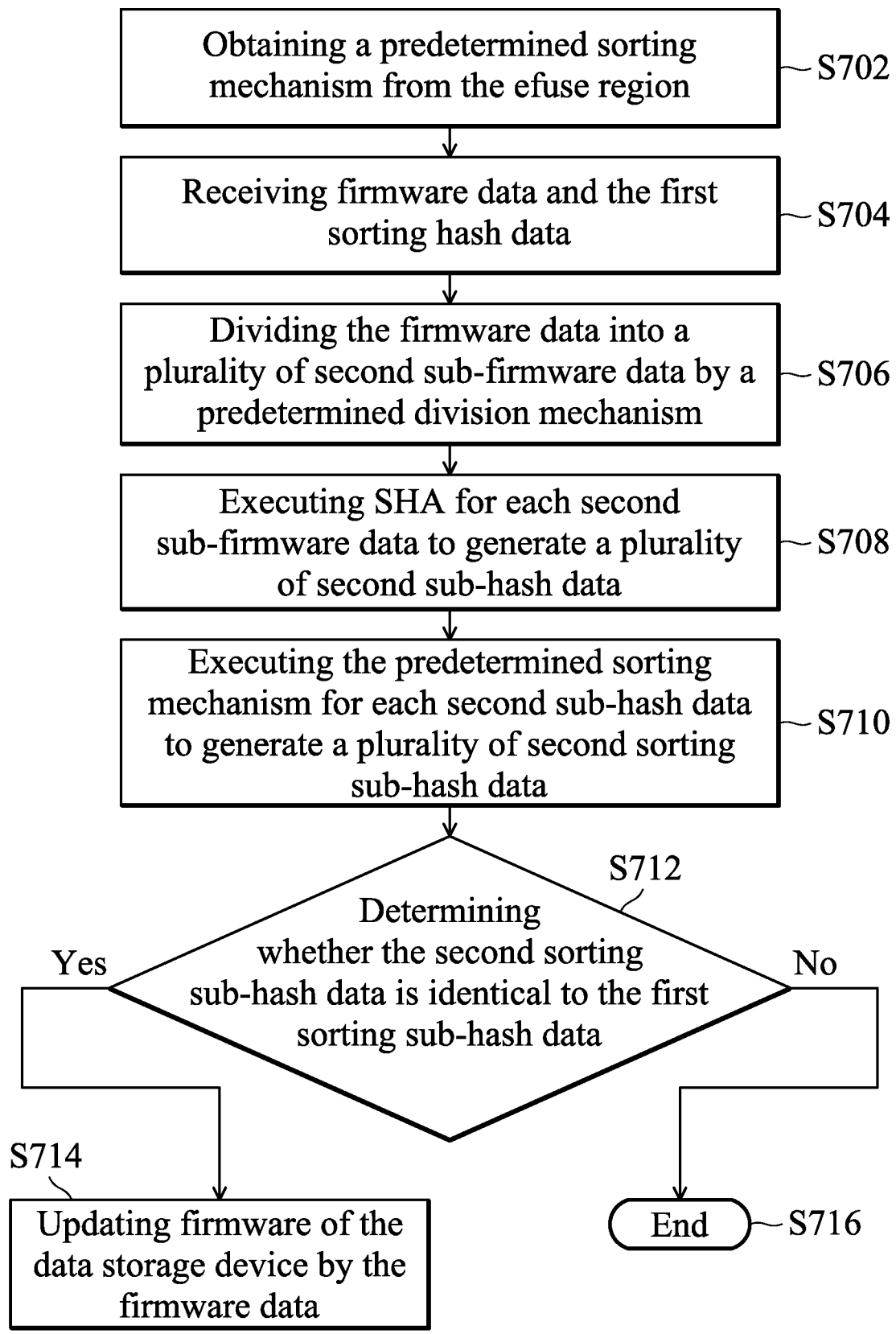
FIG. 7 is schematic illustrating another data storage method for certifying firmware data according to an embodiment of the invention.

FIG. 7 is schematic illustrating another data storage method for certifying firmware data according to an embodiment of the invention. In step S702, the controller 120 obtains a predetermined sorting mechanism from the efuse region 122. In step S704, the controller 120 receives the firmware data and the first sorting hash data. The firmware data and the first sorting hash data are extracted from the firmware package. The first sorting hash data includes a plurality of first sub-sorting hash data. In step S706, the controller 120 divides the firmware data into a plurality of second sub-firmware data by a predetermined division mechanism. In step S708, the controller 120 executes the SHA 300 for each second sub-firmware data to generate a plurality of second sub-hash data. In step S710, the controller 120 executes the predetermined sorting mechanism 320 for each second sub-hash data to generate a plurality of second sorting sub-hash data. In step S712, the controller 120 determines whether the second sorting sub-hash data is identical to the first sorting sub-hash data. If they are not identical, it terminates the execution of the data storage method for certifying firmware data. If they are identical, step S714 will be executed so that the controller 120 updates firmware of the data storage device 100 by the firmware data.

Figure 8:
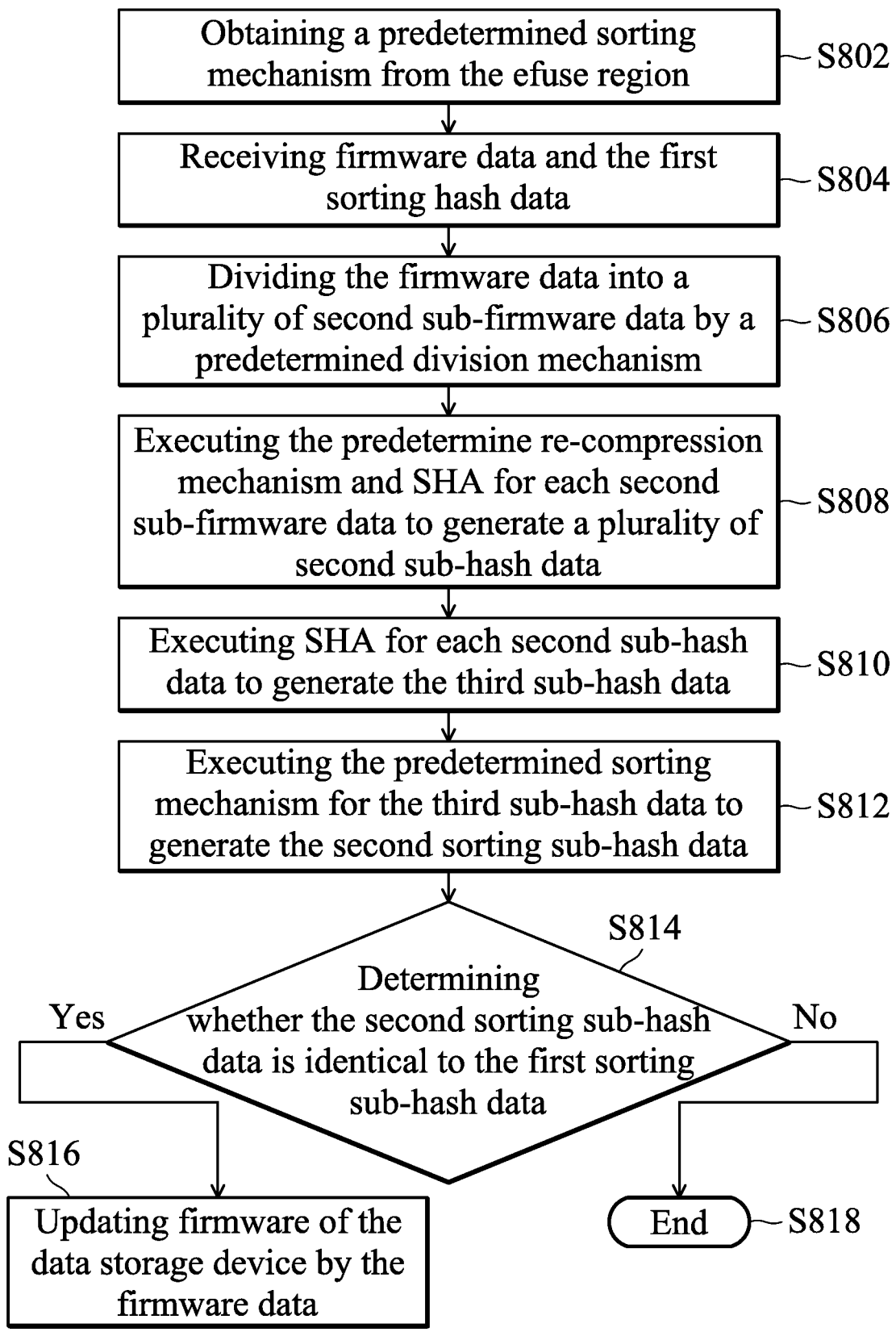
FIG. 8 is schematic illustrating another data storage method for certifying firmware data according to an embodiment of the invention.

FIG. 8 is schematic illustrating another data storage method for certifying firmware data according to an embodiment of the invention. In the embodiment, steps S802 to S806 are identical to steps S702 to S706, and will not be repeated again. In step S808, the controller 120 executes the predetermined re-compression mechanism 360 and SHA 300 for each second sub-firmware data to generate a plurality of second sub-hash data. The predetermined re-compression mechanism 360 is stored in the third specific region of the efuse region 122.

Afterwards, in step S810, the controller 120 executes the SHA 300 for each second sub-hash data to generate the third sub-hash data. In step S812, the controller 120 executes the predetermined sorting mechanism 320 for the third sub-hash data to generate the second sorting sub-hash data. In step S814, the controller 120 determines whether the second sorting sub-hash data is identical to the first sorting sub-hash data. If they are not identical, step S818 will be executed to terminate the execution of the data storage method for certifying firmware data. If they are identical, step S816 will be executed so that the controller 120 updates firmware of the data storage device 100 by the firmware data.

In another embodiment, an encryption mechanism (such as the Advanced Encryption Standard, AES) or RSA encryption algorithm could be utilized for the firmware data 10A to generate an encryption data 10B.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device for certifying firmware data, comprising:
a flash memory; and
a controller, coupled to the flash memory, utilized to receive a firmware package, wherein the firmware package comprises a firmware data and a first sorting hash data; after the controller receives the firmware package, the controller executes a secure hash algorithm (SHA) for the firmware data to generate a second hash data; wherein when the controller determines that a second sorting hash data is identical to the first sorting hash data or the second hash data is identical to a first hash data, the firmware data is allowed to update the controller; wherein the second sorting hash data, which is different from the second hash data, is generated by the controller by dividing the second hash data into a plurality of data groups and sorting the data groups based on a predetermined sorting mechanism into the second sorting hash data; wherein the first hash data is generated by the controller by sorting the first sorting hash data based on the predetermined sorting mechanism in a reverse manner, and wherein the controller further comprises:
an efuse region, utilized for writing the predetermined sorting mechanism.

2. The data storage device as claimed in claim 1, wherein the predetermined sorting mechanism is one-time written to the efuse region, and only the controller can read the predetermined sorting mechanism which is stored in the efuse region.

3. The data storage device as claimed in claim 1, wherein the first sorting hash data is inserted into the firmware data to form the firmware package.

4. The data storage device as claimed in claim 1, wherein the size of the first hash data is M bytes, the size of the efuse region is greater than or equal to M bytes, and M is a positive integer greater than one.

5. The data storage device as claimed in claim 4, wherein the predetermined sorting mechanism is stored in a first specific region of the efuse region by utilizing a table.

6. The data storage device as claimed in claim 5, wherein the size of each of the data groups is one byte or N bytes, N is less than M, and N is a positive integer greater than one.

7. The data storage device as claimed in claim 5, wherein the controller divides the firmware data into a plurality of sub-firmware data according to a predetermined division mechanism, and compresses each of the sub-firmware data based on the SHA to generate a plurality of first sub-hash data respectively.

8. The data storage device as claimed in claim 7, wherein the predetermined division mechanism is stored in a second specific region of the efuse region, and the second specific region is different from the first specific region.

9. The data storage device as claimed in claim 7, wherein the controller compresses the first sub-hash data by utilizing the SHA based on a predetermined re-compression mechanism to generate at least one second sub-hash data.

10. The data storage device as claimed in claim 9, wherein the predetermined re-compression mechanism is stored in a third specific region of the efuse region, and the third specific region is different from the first specific region and the second specific region.

11. A data storage method for certifying firmware data, applied to a data storage device which comprises a flash memory and a controller, comprising:
   receiving a firmware package, wherein the firmware package comprises a firmware data and a first sorting hash data;
   executing a secure hash algorithm (SHA) for the firmware data to generate a second hash data; and
   when determining that a second sorting hash data is identical to the first sorting hash data or the second hash data is identical to a first hash data, allowing the firmware data to update the controller; wherein the second sorting hash data, which is different from the second hash data, is generated by dividing the second hash data into a plurality of data groups and sorting the plurality of data groups based on a predetermined sorting mechanism into the second sorting hash data; and wherein the first hash data is generated by sorting the first sorting hash data based on the predetermined sorting mechanism in a reverse manner.

12. The data storage method as claimed in claim 11, wherein the predetermined sorting mechanism is one-time written to a first specific region of the efuse region, and only the controller can read the predetermined sorting mechanism which is stored in the efuse region.

13. The data storage method as claimed in claim 11, wherein the first sorting hash data is inserted into the firmware data to form the firmware package.

14. The data storage method as claimed in claim 11, wherein the size of the first hash data is M bytes, the size of the efuse region is greater than or equal to M bytes, and M is a positive integer greater than one.

15. The data storage method as claimed in claim 14, wherein the size of each of the data groups is one byte or N bytes, N is less than M, and N is a positive integer greater than one.

16. The data storage method as claimed in claim 12, further comprising:
   dividing the firmware data into a plurality of sub-firmware data according to a predetermined division mechanism; and
   compressing each of the sub-firmware data based on the SHA to generate a plurality of first sub-hash data respectively, wherein the predetermined division mechanism is stored in a second specific region of the efuse region, and the second specific region is different from the first specific region.

17. The data storage method as claimed in claim 16, further comprising:
   compressing the first sub-hash data by utilizing the SHA based on a predetermined re-compression mechanism to generate at least one second sub-hash data, wherein the predetermined re-compression mechanism is stored in a third specific region of the efuse region, and the third specific region is different from the first specific region and the second specific region.

18. A data storage device for certifying firmware data, comprising:
   a controller, utilized to receive a firmware package, wherein the firmware package comprises firmware data and a first sorting hash data, after the controller receives the firmware package, the controller executes a secure hash algorithm (SHA) for the firmware data to generate a second hash data; wherein when the controller determines that a second sorting hash data is identical to the first sorting hash data or the second hash data is identical to a first hash data, the firmware data is allowed to update the controller; wherein the second sorting hash data, which is different from the second hash data, is generated by the controller by dividing the second hash data into a plurality of data groups and sorting the data groups based on a predetermined sorting mechanism into the second sorting hash data; wherein the first hash data is generated by the controller by sorting the first sorting hash data based on the predetermined sorting mechanism in a reverse manner; and wherein the controller further comprises:
   an efuse region, utilized for storing the predetermined sorting mechanism and the first sorting hash data.

19. The data storage device as claimed in claim 18, wherein the predetermined sorting mechanism is set up by a manufacturer of the data storage device.

* * * * *